United States Patent [19]

Cho

[11] Patent Number: 4,691,996
[45] Date of Patent: Sep. 8, 1987

[54] WIDE-ANGLE PHOTOGRAPHIC LENS
[75] Inventor: Michio Cho, Tokyo, Japan
[73] Assignee: Fuji Photo Film Co., Ltd., Kanagawa, Japan
[21] Appl. No.: 778,070
[22] Filed: Sep. 20, 1985
[30] Foreign Application Priority Data
  Oct. 9, 1984 [JP] Japan .................... 59-210577
[51] Int. Cl.⁴ .................... G02B 9/60; G02B 13/18
[52] U.S. Cl. .................... 350/465; 350/432
[58] Field of Search .......... 350/465, 464, 432-435
[56] References Cited
  U.S. PATENT DOCUMENTS
  4,390,250  6/1983  Imai ........................ 350/465
  4,429,958  2/1984  Yamaguchi ............ 350/465 X
  4,477,154  10/1984 Sato ...................... 350/465 X
  4,576,448  3/1986  Ikari ...................... 350/465

Primary Examiner—John K. Corbin
Assistant Examiner—Scott J. Sugarman
Attorney, Agent, or Firm—Young & Thompson

[57] ABSTRACT

A wide-angle photographic lens system having a shortened overall length consisting of, in the order from the object side, first lens means comprising a positive meniscus lens with a convex surface directed to the object, second lens means comprising a negative lens, third and fourth lens means of positive lenses, and a fifth lens means of a negative meniscus lens with a concave surface directed to the object.

9 Claims, 6 Drawing Figures

FIG. 4
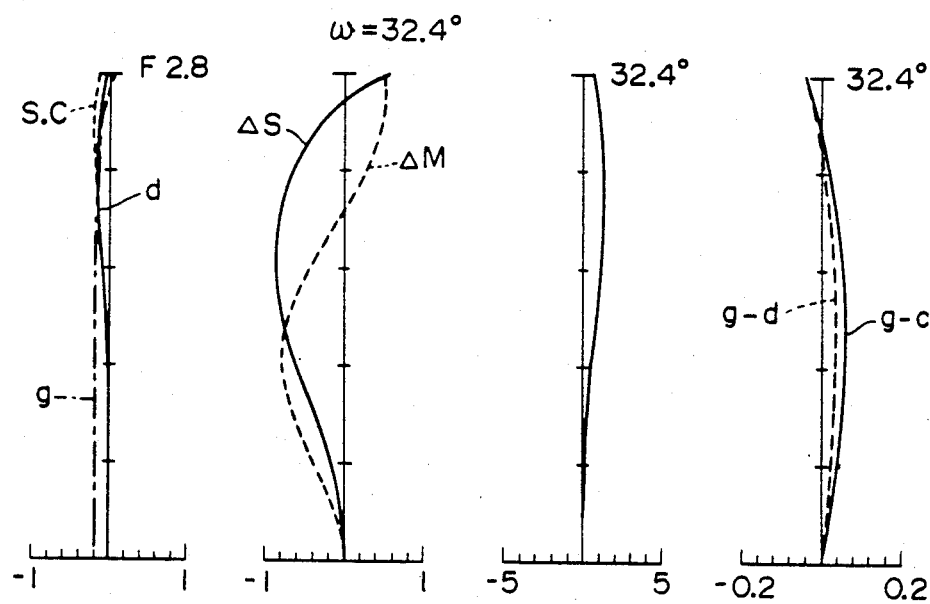
SPHERICAL ABERRATION   ASTIGMATISM   DISTORTION (%)   CHROMATIC ABERRATION OF MAGNIFICATION
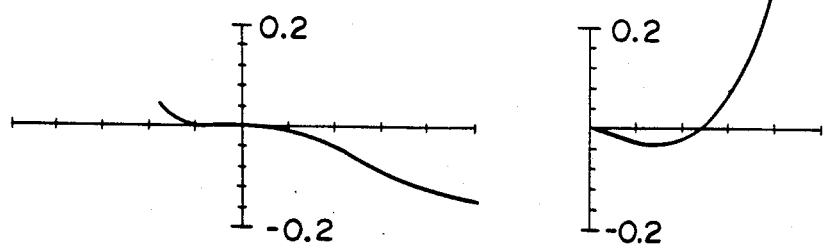
COMA ABERRATION
($\omega = 23.9°$)

FIG. 6
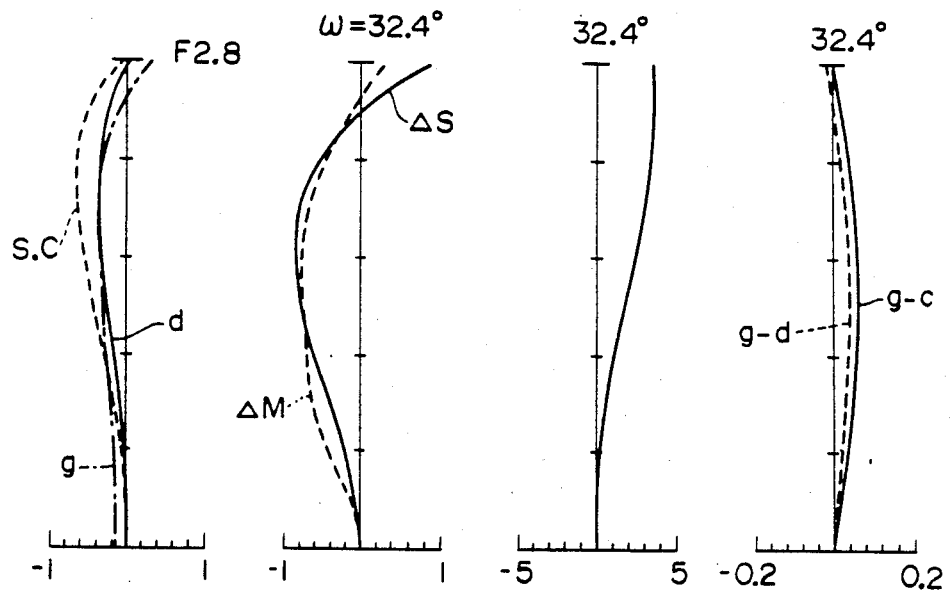
SPHERICAL ASTIGMATISM DISTORTION CHROMATIC
ABERRATION                    (%)         ABERRATION
                                          OF MAGNI-
                                          FICATION
MERIDIONAL          SAGITTAL
RAYS                RAYS
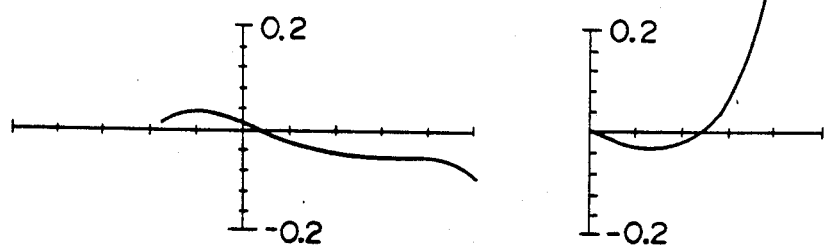
COMA ABERRATION
($\omega = 23.9°$)

WIDE-ANGLE PHOTOGRAPHIC LENS

BACKGROUND OF THE INVENTION

1. Field of the Invention

The present invention relates to a wide-angle photographic lens system having a shortened overall length.

2. Description of the Prior Art

A recent tendency in designing 35 mm-size compact cameras is to provide a camera body with a protective cover which is supported for slidable covering and uncovering movement in order to protect the taking lens. In such cameras, the taking lens, if it has a long lens system, requires the provision of a large-sized protective cover, resulting in a bulky camera body. Therefore, when making a camera body compact, it is first of importance to incorporate a taking lens having a shortened overall length of the lens system thereinto.

As is well known in the art, it is essential for shortening the overall length of a lens system to make the total focal length thereof shorter, i.e., the angle of view larger and to decrease the telephoto ratio thereof as much as possible. It should be noted herein that the telephoto ratio is the value of the overall length of the lens system divided by the total focal length thereof. For the decrease of the telephoto ratio, it is known to comprise the lens system of forward lens means with a positive power and rearward lens means with a negative power. However, such a lens system having a positive-negative power distribution in this order from the object side shows a tendency to increase various aberrations such as distortion, astigmatism and the like with a decrease of the telephoto ratio of the lens system itself or an increase of the angle of view thereof. An example of such a wide-angle lens system having the positive-negative power distribution is disclosed in, for example, Japanese Patent Unexam. Publ. No. 57-116313. The wide-angle lens system shown in the foregoing Jap. Patent Unexam. Publ. No. 57-116316 has an F ratio of 2.8, an angle of view of 59° and a telephoto ratio of 1.0. When incorporating the wide-angle lens into a certain type of 35 mm-size compact camera, the overall length of the lens system will be estimated to be 38 mm which is considered too long.

SUMMARY OF THE INVENTION

It is therefore an object of the present invention to provide a wide-angle photographic lens which has a sufficiently shortened overall length of the lens system and provides good correction of the various aberrations.

According to the present invention, there is provided a shortened overall length wide-angle lens system of the five-component type including first lens means comprising a positive meniscus lens with a convex surface directed to the object, second lens means comprising a negative lens, third and fourth lens means comprising positive lenses, and fifth lens means comprising a negative meniscus lens with a concave surface directed to the object arranged in this order from the object side.

BRIEF DESCRIPTION OF THE DRAWINGS

FIGS. 2, 4 and 6 are diagrams showing various aberrations of the lens systems according to Examples 1, 2 and 3.

Figure 1:
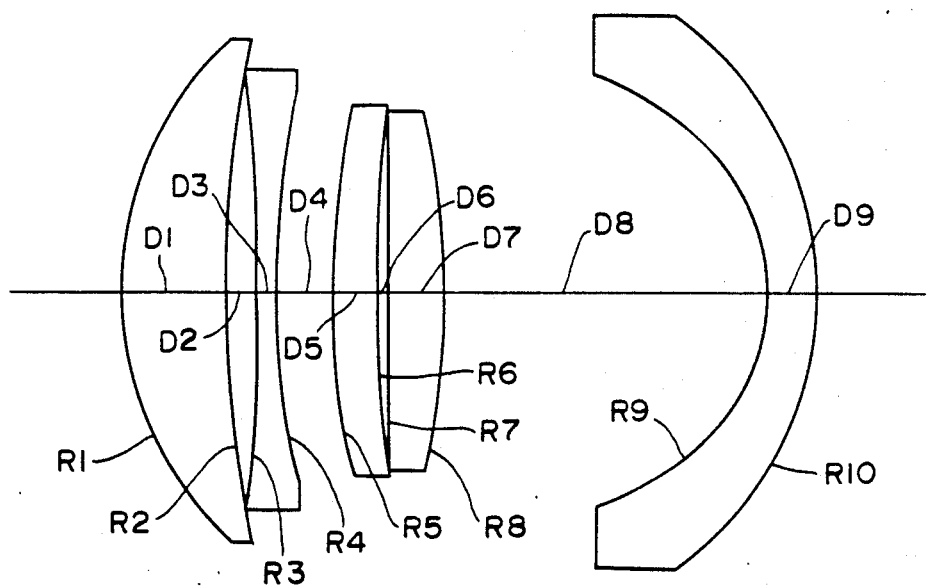
FIGS. 1, 3 and 5 are schematic diagrams showing lens systems according to Examples 1, 2 and 3 of the present invention.

In the drawings, R is the radius of curvature of the i-th lens surface, and Di is the thickness of the i-th lens or the air space between the adjacent lenses.

DETAILED DESCRIPTION OF THE PREFERRED EMBODIMENTS

The present invention will now be described in detail in connection with the accompanying drawings.

When reducing the telephoto ratio of a wide-angle lens system, the entire lens system may be composed of lens components of a strong positive power for the forward lens and of a strong negative power for the rearward lens. As disclosed in the above-mentioned Jap. Patent Unexam. Publ. No. 57-116313, however, the wide-angle lens system including the forward lens which comprises three elements with a strong power generates a spherical aberration of a high degree. Specifically, in this type of wide-angle lens system, since the wide-angle lens is focused by moving only the forward lens means, the wide-angle lens system generates an insufficiently corrected spherical aberration when focused on the object at a short distance.

The foregoing problem can be eliminated by composing a lens system of first lens means comprising a positive meniscus lens with a convex surface directed to the object, second lens means comprising a negative lens, third and fourth lens means comprising positive lenses, and fifth lens means comprising a negative meniscus lens with a concave surface directed to the object arranged in this order from the object side, and by rendering the wide-angle lens system to satisfy the following conditions:

$$0.5 < (f_4/f) < 0.9 \quad \text{(i)}$$

$$-5 < (R_5 + R_6)/(R_5 - R_6) < 0 \quad \text{(ii)}$$

$$0 < (R_7 + R_8)/(R_7 - R_8) < 4 \quad \text{(iii)}$$

where
  f is the focal length of the overall lens system.
  $f_4$ is the resultant focal length of the first to fourth lens means,
  $R_5$ is the radius of curvature of the object side surface of the third lens means,
  $R_6$ is the radius of curvature of the image side surface of the third lens means,
  $R_7$ is the radius of curvature of the object side surface of the fourth lens means,
  $R_8$ is the radius of curvature of the image side surface of the fourth lens means.

The wide-angle lens system with a shortened overall length thus composed has proven to have a sufficiently reduced telephoto ratio and a sufficient correction of various aberrations.

The condition (i) is required to give a properly reduced value of telephoto ratio. If the lens system were to exceed the upper limit (0.9) of the condition (i), the value of the telephoto ratio could not be sufficiently reduced. Below the lower limit (0.5) of the condition (i), the power of the front means would become too strong to sufficiently correct various aberrations.

The condition (ii) serves to compensate coma aberration and off-axial sagittal spherical aberration. If the upper limit (0) of the condition (ii) were exceeded, the lens system would generate inwardly oriented coma aberration at an intermediate angle of view. Below the lower limit (−5) of the condition (ii), outwardly oriented coma aberration at an intermediate angle of view would be generated and off-axial sagittal spherical aberration would be over-corrected so as not only to produce halo but also to lower the contrast.

The condition (iii) compensates for astigmatism and distortion. If the upper limit (4) of the condition (iii) were exceeded, the astigmatism of the lens system would increase. On the other hand, below the lower limit (0) of the condition (iii), the forward lens means would generate a considerable positive distortion which could not be compensated by the rearward means.

According to the first example of the present invention, the third and fifth lens means have aspherical surfaces directed to the object. The provision of the third lens means with an aspherical surface directed to the object assures the easy correction of spherical aberration and makes it possible to reduce the value of the telephoto ratio further. On the other hand, the provision of the aspherical surface of the fifth lens means contributes to a fine correction of aberrations such as astigmatism, distortion and coma aberration.

According to the second example of the present invention, the lens system is so composed as to further satisfy the following conditions:

$$1.55 < N_+ < 1.68 \quad \text{(iv)}$$

$$1.75 < N_2 \quad \text{(v)}$$

where $N_+$ is the average value of the refractive indices of all the positive lenses, and $N_2$ is the refractive index of the second lens means.

The conditions (iv) and (v) are given for maintaining the Petzval sum in a good condition. If the upper limit (1.68) of the condition (iv) and the lower limit (1.75) of the condition (v) were exceeded simultaneously, the Petzval sum would become negative or too small, resulting in the impossibility of the simultaneous correction of astigmatism and distortion. Below the lower limit of the condition (iv), the refractive power of the positive lens would become too small to sufficiently correct spherical and coma aberrations, although the Petzval sum would be proper.

According to the last example of the present invention, the lens system is so composed as to satisfy the following condition:

$$(vi) \quad 0 < \nu_1 - \frac{\nu_3 + \nu_4}{2} < 15$$

where $\nu_i$ is the Abbe number of the i-th lens means.

This condition is required to balance the longitudinal and transverse chromatic aberrations. If the upper limit (15) of the condition (vi) were exceeded, the longitudinal chromatic aberration would be over-corrected, while the transverse chromatic aberration would be properly corrected. Below the lower limit (0) of the condition (vi), the longitudinal chromatic aberration would tend to increase while the transverse chromatic aberration would be proper.

According to the other example of the present invention, the lens system comprises the third and fifth components with aspherical surfaces which are made of optical plastics. An aspherical lens made of glass is, generally, too expensive to be used in compact cameras which are manufactured at low cost. For this reason, the third and fifth aspherical lenses being made of plastics contributes to providing the lens system at low cost.

Figure 3:
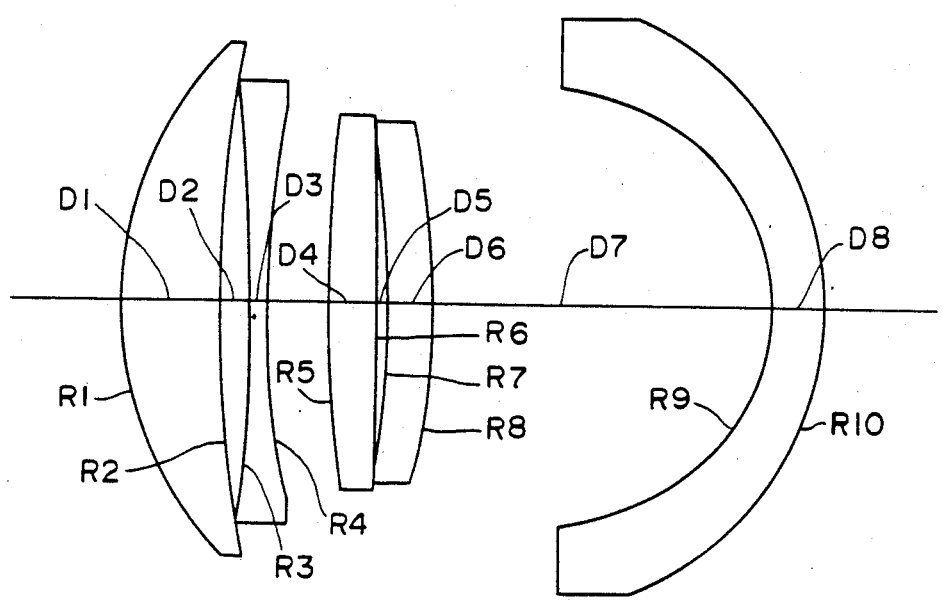
Figure 5:
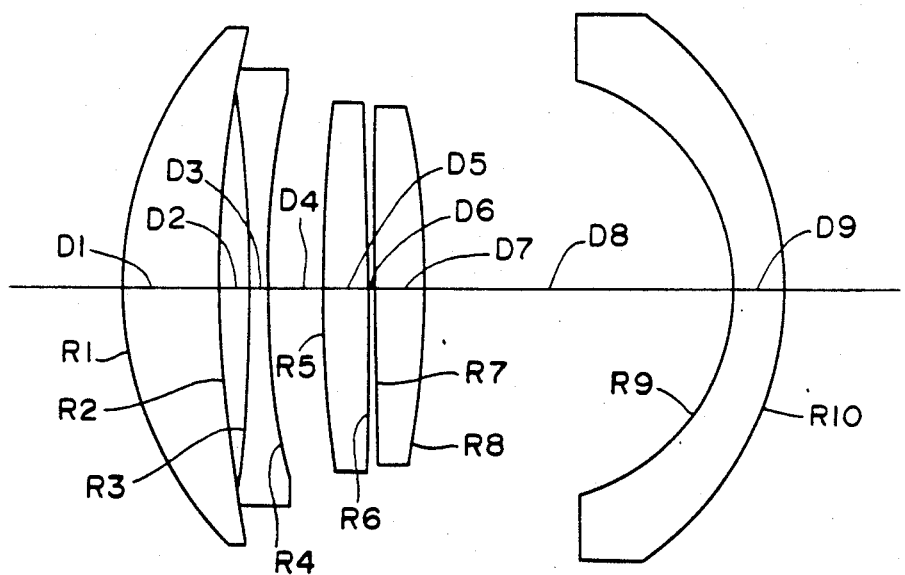

Numerical values for Examples 1, 2 and 3 shown in FIGS. 1, 3 and 5 according to the present invention will be described below. Designated at R is the radius of curvature, D the thickness of lenses or air space between adjacent lenses, Nd the refractive index with respect to d-line, $\nu$ the Abbe number, f the focal length, F the F number, and $\omega$ the half view angle. The surface marked with * is an aspherical surface which is specified by the following equation:

$$Z = \frac{H^2/R}{1 + \sqrt{1 + (k + 1)(H/R)^2}} + aH^4 + bH^6 + cH^8 + dH^{10}$$

where the optical axis is given as the Z coordinate axis, H is the height from the optical axis, the intersection of the optical axis and the lens surface is the origin, and k, a, b, c and d are the coefficients of the asperical surface.

Figure 2:
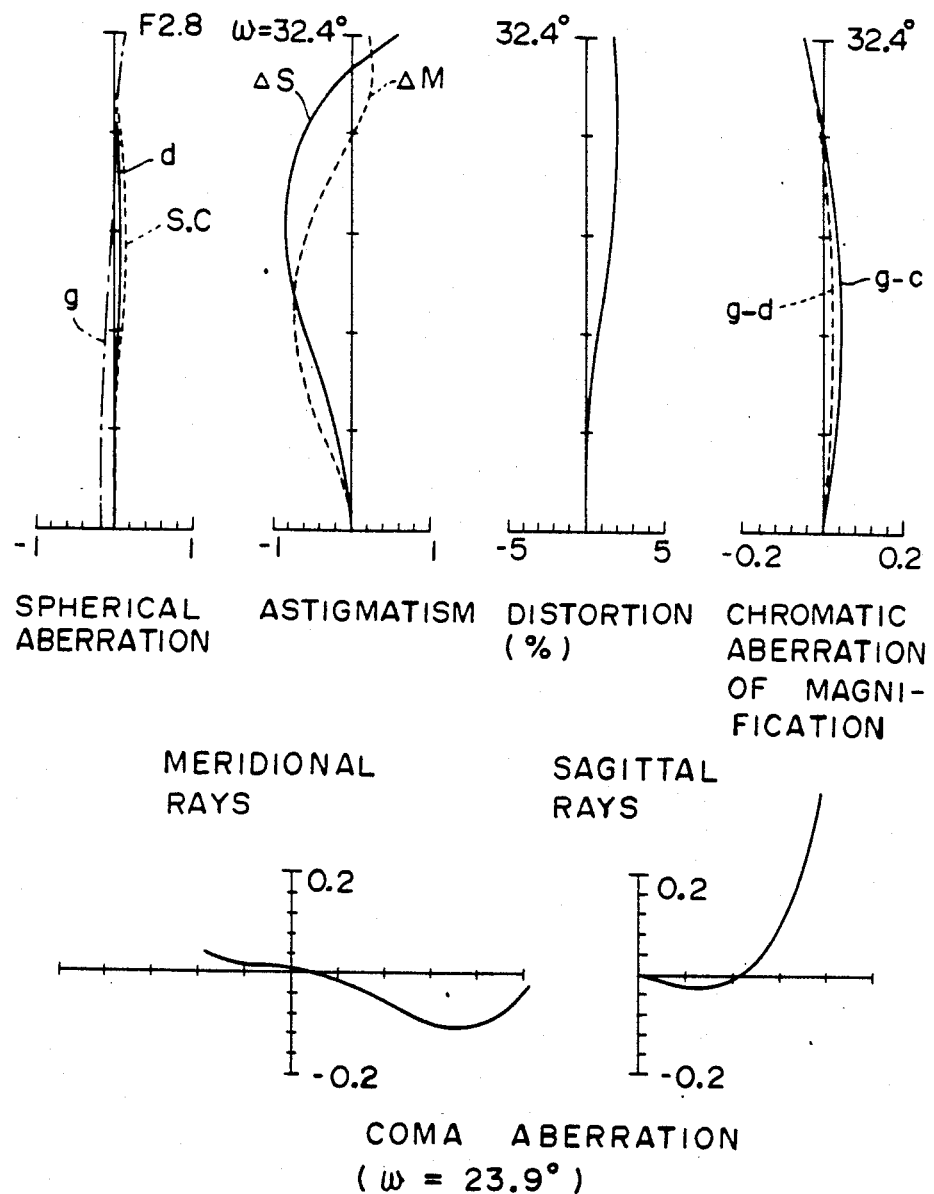

Various aberrations of the respective examples are illustrated in FIGS. 2, 4 and 6.

EXAMPLE 1

| i | R | D | Nd | $\nu$ |
|---|---|---|---|---|
| 1 | 29.435 | 9.38 | 1.63854 | 55.4 |
| 2 | 106.194 | 2.72 | | |
| 3 | −223.048 | 1.76 | 1.84666 | 23.7 |
| 4 | 72.963 | 5.22 | | |
| 5* | 61.141 | 4.16 | 1.49176 | 57.5 |
| 6 | 146.708 | 1.01 | | |
| 7 | −622.506 | 4.97 | 1.67270 | 32.2 |
| 8 | −65.384 | 29.23 | | |
| 9* | −16.432 | 4.40 | 1.49176 | 57.5 |
| 10 | −29.184 | | | | f = 100
F = 2.8
2$\omega$ = 64.8°
Telephoto ratio = 0.935
Petzval sum = 0.111
*Aspherical Coefficient

| i | k | a | b | c | d |
|---|---|---|---|---|---|
| 5 | 0 | −5.339 × $10^{-6}$ | 0 | 0 | 0 |
| 9 | −0.365 | 2.184 × $10^{-6}$ | −1.427 × $10^{-8}$ | 5.426 × $10^{-11}$ | −9.581 × $10^{-14}$ |

EXAMPLE 2

| i | R | D | Nd | $\nu$ |
|---|---|---|---|---|
| 1 | 30.894 | 8.90 | 1.69350 | 53.4 |
| 2 | 109.295 | 2.63 | | |
| 3 | −250.656 | 1.76 | 1.84666 | 23.7 |
| 4 | 81.188 | 5.63 | | |
| 5* | 107.080 | 4.27 | 1.49176 | 57.5 |
| 6 | −477.538 | 0.77 | | |
| 7 | −121.435 | 4.40 | 1.64769 | 33.8 |
| 8 | −58.173 | 30.48 | | |
| 9* | −15.986 | 4.40 | 1.49176 | 57.5 |
| 10 | −26.547 | | | | f = 100
F = 2.8
2$\omega$ = 64.8°
Telephoto ratio = 0.935
Petzval sum = 0.112
*Aspherical Coefficient

| i | k | a | b | c | d |
|---|---|---|---|---|---|
| 5 | 0 | −4.57 × $10^{-6}$ | 0 | 0 | 0 |
| 9 | −0.345 | 2.169 × | −5.151 × | −1.887 × | 4.630 × |

-continued

| | | | |
|---|---|---|---|
| $10^{-6}$ | $10^{-10}$ | $10^{-11}$ | $10^{-14}$ |

EXAMPLE 3

| r | R | D | Nd | ν |
|---|---|---|---|---|
| 1 | 31.793 | 8.75 | 1.77250 | 49.6 |
| 2 | 94.172 | 2.64 | | |
| 3 | −162.799 | 1.76 | 1.84666 | 23.7 |
| 4 | 77.424 | 5.21 | | |
| 5* | 120.247 | 4.06 | 1.49176 | 57.5 |
| 6 | −471.604 | 0.59 | | |
| 7 | 1237.545 | 4.45 | 1.60342 | 38.0 |
| 8 | −72.368 | 27.58 | | |
| 9* | −16.960 | 4.40 | 1.49176 | 57.5 |
| 10 | −29.270 | | | | f = 100
F = 2.8
2ω = 64.8°
Telephoto ratio = 0.937
Petzval sum = 0.111
*Aspherical Coefficient

| i | k | a | b | c | d |
|---|---|---|---|---|---|
| 5 | 0 | $-2.206 \times 10^{-6}$ | 0 | 0 | 0 |
| 9 | −0.340 | $7.905 \times 10^{-7}$ | $-3.253 \times 10^{-8}$ | $1.243 \times 10^{-10}$ | $-2.831 \times 10^{-13}$ |

What is claimed is:

1. A wide-angle photographic lens system having a shortened overall length and consisting essentially of first lens means comprising a positive meniscus lens having a convex surface directed to the object, second lens means comprising a negative lens, third and fourth lens means comprising positive lenses, and fifth lens means consisting of a negative meniscus lens having a concave surface directed to the object, arranged in this order from the object side, said lens system satisfying the following conditions:

$$0.5 < (f_A/f) < 0.9 \quad \text{(i)}$$

$$-5 < (R_5 + R_6)/(R_5 - R_6) < 0 \quad \text{(ii)}$$

$$0 < (R_7 + R_8)/(R_7 - R_8) < 4 \quad \text{(iii)}$$

where f is the focal length of the overall lens system, $f_A$ is the resultant focal length of the first to fourth lens means, $R_5$ is the radius of curvature of the object side surface of the third lens means, $R_6$ is the radius of curvature of the image side surface of the third lens means, $R_7$ is the radius of curvature of the object side surface of the fourth lens means, and $R_8$ is the radius of curvature of the image side surface of the fourth lens means;
said lens system being adapted to correct positive distortion, field curvature and lateral chromatic aberrations.

2. A wide-angle photographic lens system as claimed in claim 1, wherein said third and fifth lens means have aspherical surfaces directed to the object.

3. A wide-angle photographic lens system as claimed in claim 1, further satisfying the following conditions:

$$1.55 < N_+ < 1.68 \quad \text{(iv)}$$

$$1.75 < N_2 \quad \text{(v)}$$

where $N_+$ is the average value of the refractive indices of all the positive lenses, and $N_2$ is the refractive index of the second lens means.

4. A wide-angle photographic lens system as claimed in claim 1, further satisfying the following condition:

$$\text{(vi)} \quad 0 < \nu_1 - \frac{\nu_3 + \nu_4}{2} < 15$$

where $\nu_1$, $\nu_3$ and $\nu_4$ are the Abbe numbers of the first, third and fourth lens means, respectively.

5. A wide-angle photographic lens system as claimed in claim 2, wherein said third and fifth lens means are made of optical plastics.

6. A wide-angle photographic lens system having a shortened overall length comprising: first lens means comprising a positive meniscus lens having a convex surface directed to the object, second lens means comprising a negative lens, third and fourth lens means comprising positive lenses, and fifth lens means comprising a negative meniscus lens having a concave surface directed to the object arranged in this order from the object side, said lens system satisfying the following conditions:

$$0.5 < (f_A/f) < 0.9 \quad \text{(i)}$$

$$-5 < (R_5 + R_6)/(R_5 - R_6) < 0 \quad \text{(ii)}$$

$$0 < (R_7 + R_8)/(R_7 - R_8) < 4 \quad \text{(iii)}$$

$$1.55 < N_+ < 1.68 \quad \text{(iv)}$$

$$1.75 < N_2 \quad \text{(v)}$$

where $N_+$ is the average value of the refractive indices of all the positive lenses, $N_2$ is the refractive index of the second lens means, f is the focal length of the overall lens system, $f_A$ is the resultant focal length of the first to fourth lens means, $R_5$ is the radius of curvature of the object side surface of the third lens means, $R_6$ is the radius of curvature of the image side surface of the third lens means, $R_7$ is the radius of curvature of the object side surface of the fourth lens means, and $R_8$ is the radius of curvature of the image side surface of the fourth lens means.

7. A wide-angle photographic lens system as claimed in claim 6, further satisfying the following condition:

$$\text{(vi)} \quad 0 < \nu_1 - \frac{\nu_3 + \nu_4}{2} < 15$$

where $\nu_1$, $\nu_3$ and $\nu_4$ are the Abbe numbers of the first, third and fourth lens means, respectively.

8. A wide-angle photographic lens system as claimed in claim 6, wherein said third and fifth lens means have aspherical surfaces directed to the object.

9. A wide-angle photographic lens system as claimed in claim 8, wherein said third and fifth lens means are made of optical plastics.

* * * * *